(12) United States Patent
Muylaert et al.

(10) Patent No.: US 8,568,100 B2
(45) Date of Patent: Oct. 29, 2013

(54) BI-AXIAL COMPLIANT BEARING

(75) Inventors: Neal W. Muylaert, Apache Junction, AZ (US); Lyndon Claudius Lamborn, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 995 days.

(21) Appl. No.: 12/331,272

(22) Filed: Dec. 9, 2008

(65) Prior Publication Data
US 2010/0143141 A1    Jun. 10, 2010

(51) Int. Cl.
  *B63H 7/00* (2006.01)
  *B64C 11/06* (2006.01)
  *F01D 5/00* (2006.01)

(52) U.S. Cl.
  USPC .................. 416/174; 416/205; 415/170.1

(58) Field of Classification Search
  USPC ............... 415/1, 170.1, 229; 416/1, 174, 205, 416/163, 164
  See application file for complete search history.

(56) References Cited

U.S. PATENT DOCUMENTS

| | | | |
|---|---|---|---|
| 4,208,889 A * | 6/1980 | Peterson | 464/138 |
| 4,297,078 A * | 10/1981 | Martin | 416/134 A |
| 5,052,824 A | 10/1991 | Van Wyk | |
| 5,114,244 A | 5/1992 | Dunham et al. | |
| 5,297,934 A * | 3/1994 | Desjardins | 416/163 |
| 5,906,476 A * | 5/1999 | Arlton | 416/114 |
| 5,988,885 A | 11/1999 | Heshmat | |
| 6,413,003 B1 | 7/2002 | Schmidt et al. | |
| 6,921,249 B1 * | 7/2005 | Haynie et al. | 416/134 R |
| 7,037,072 B2 * | 5/2006 | Carson | 416/1 |
| 7,326,036 B1 * | 2/2008 | Habin et al. | 416/148 |
| 7,448,478 B2 | 11/2008 | Thomas | |
| 7,585,153 B1 * | 9/2009 | Schmaling et al. | 416/129 |
| 2004/0022464 A1 * | 2/2004 | Schinazi et al. | 384/192 |
| 2008/0206045 A1 * | 8/2008 | Foucher | 415/160 |

* cited by examiner

*Primary Examiner* — Dean O Takaoka
*Assistant Examiner* — Alan Wong
(74) *Attorney, Agent, or Firm* — Toler Law Group, PC (57) ABSTRACT

Embodiments of a bi-axial compliant bearing assembly and methods of assembling the bi-axial compliant bearing assembly are disclosed. A bi-axial compliant bearing assembly employs a transition bearing race. The transition bearing race comprises a cylindrical surface. The cylindrical surface is configured to rotatably engage a rotational bearing element and to slidably engage the rotational bearing element along an axis. The transition bearing race also includes a spherically-compliant surface. The spherically-compliant surface is configured to engage a spherically-compliant element and to enable the spherically-compliant element to rotate transversely to the axis.

27 Claims, 10 Drawing Sheets

BI-AXIAL COMPLIANT BEARING

FIELD OF THE DISCLOSURE

The present disclosure is generally related to a bearing configured to enable compliance along multiple axes to offset forces applied along the multiple axes to bodies coupled to the bearing.

BACKGROUND

Bearings are commonly used to couple two bodies that rotate relative to each other. The design and maintenance of the bearings may be complicated when one or more of those bodies are subjected to lateral forces as well as rotational forces. For example, in the case of a helicopter rotor assembly, the rotors are rotationally mounted to the rotor hub to enable adjustment of rotor pitch to control vertical thrust. However, at the same time, rapid rotation of the rotors generates centrifugal forces and displacements axially along a rotational axis about which the pitch is adjusted. At the same time, upward and downward movement of the rotors and side-to-side movement of the rotors results in forces transverse to the rotational pitch axis.

The bearings used in a helicopter rotor assembly have to enable rotation to adjust rotor pitch while accounting for the axial and transverse stresses. Uneven bearing loading resulting from the axial and transverse stresses may be undesirable. As a result, bearings used in a helicopter rotor assembly generally employ multiple bearing elements and bearing surfaces in a sophisticated arrangement to enable rotor pitch rotation while distributing the axial and transverse loads. Unfortunately, such designs typically involve a significant number of parts which, in turn, results in added weight that may reduce vehicle efficiency and responsiveness. Such designs also may result in increased complexity in both the manufacture of and the maintenance of the helicopter rotor assembly, thereby increasing the cost of owning and operating the helicopter.

Therefore, it would be advantageous to have an apparatus and a method that overcomes one or more of the issues described above.

SUMMARY

Embodiments of a bi-axial compliant bearing assembly are disclosed. A bi-axial compliant bearing assembly employs a transition bearing race. The transition bearing race comprises a cylindrical surface. The cylindrical surface is configured to rotatably engage a rotational bearing element and to slidably engage the rotational bearing element along an axis. The transition bearing race also includes a spherically-compliant surface. The spherically-compliant surface is configured to engage a spherically-compliant element and to enable the spherically-compliant element to rotate transversely to the axis.

According to another embodiment, a system comprises a transition bearing race that has a cylindrical surface. The cylindrical surface includes an outward-facing surface disposed about an axis. The transition bearing race also comprises an inward-facing spherically-compliant surface. The system further includes a rotational bearing element having an inward-facing cylindrical surface configured to rotatably and slidably engage the outward-facing cylindrical surface along the axis. The system further includes a spherically-compliant element having an outward-facing spherical surface configured to rotatably engage the inward-facing spherically-compliant surface to enable the spherically-compliant element to rotate transversely to the axis.

According to yet another embodiment, a helicopter rotor hub assembly comprises a plurality of spindle arms. Each of the plurality of spindle arms extends radially from a rotor axis. The helicopter rotor hub assembly further comprises a plurality of bi-axial compliant bearing assemblies. Each of the plurality of bi-axial compliant bearing assemblies comprises a transition bearing race including an outward-facing cylindrical surface and an inward-facing spherically-compliant surface. A rotational bearing element includes an inward-facing cylindrical surface configured to slidably engage the outward-facing cylindrical surface of the transition bearing race and an outer surface configured to engage a helicopter rotor blade. A spherically-compliant element includes an outward-facing spherically-compliant surface configured to rotatably engage the inward-facing spherically-compliant surface and a spindle coupling configured to be coupled to one of the plurality of spindle arms.

According to a further embodiment, a method comprises providing a transition bearing race. The transition bearing race has an outward-facing cylindrical surface and an inward-facing spherically-compliant surface. A rotational bearing element is also provided. The rotational bearing element has an inward-facing cylindrical surface configured to rotatably and slidably engage the outward-facing cylindrical surface. A spherically-compliant element is provided. The spherically-compliant element has an outward-facing spherically-compliant surface. The outward-facing spherically-compliant surface is configured to rotatably engage the inward-facing spherically-compliant surface. The inward-facing spherically-compliant surface is disposed adjacent to a second body. The spherically-compliant element is inserted into the inward-facing spherically-compliant surface and the spherically-compliant element is coupled to the second body. The rotational bearing element is coupled to a first body. The first body is disposed to position the rotational bearing element over the outward-facing cylindrical surface of the transition bearing race.

According to another embodiment, a bi-axial compliant bearing assembly comprises a transition bearing race. The transition bearing race has an outward-facing cylindrical surface disposed about an axis. The transition bearing race also has a loading ramp abutting an edge of the outward-facing cylindrical surface. The loading ramp is configured to guide an inward-facing cylindrical surface into place over the outward-facing cylindrical surface. The inward-facing spherically-compliant surface of the transition bearing race includes a pair of loading slots configured to receive an outward-facing spherically compliant surface when rotated and presented edgewise into the pair of loading slots. A rotational bearing element has an outer surface configured to engage a helicopter rotor blade. The inward-facing cylindrical surface of the rotational bearing element is configured to rotatably engage the outward-facing cylindrical surface about the axis and to slidably engage the outward-facing cylindrical surface along the axis. A plurality of individual bearings supported by the inward-facing cylindrical surface enables the rotational bearing element to rotatably engage the outward-facing cylindrical surface. A spherically-compliant element has the outward-facing spherically-compliant surface that is configured to rotatably engage the inward-facing spherically-compliant surface to enable the spherically-compliant element to rotate transversely to the axis. A plurality of mounting tabs included in the spherically-compliant element is configured to engage a spindle arm of a helicopter rotor hub assembly.

The features, functions, and advantages that will be discussed can be achieved independently in various embodiments or may be combined in yet other embodiments, further details of which can be seen with reference to the following description and drawings.

DETAILED DESCRIPTION

A particular illustrative embodiment of the present disclosure employs a bi-axial compliant bearing assembly that, in one embodiment, enables a helicopter rotor blade to be rotationally mounted to a spindle arm of a helicopter rotor hub assembly to enable rotor pitch adjustment while accounting for axial and transverse loads resulting from rotation, flap, and lead/lag of the helicopter rotor blades. An embodiment of the bi-axial compliant bearing assembly employs a transition bearing race that supports an inward-facing spherically-compliant surface that engages an outwardly-facing spherically-compliant surface of a spherical element while receiving a rotational bearing element on an outward-facing cylindrical surface. The spherically-compliant element's rotational engagement of the spherically-compliant surface of the transition bearing race reacts to transverse loads applied to the helicopter rotor blades. The rotational bearing element's engagement of the outward-facing cylindrical surface of the transition race bearing enables the helicopter rotor blade to be rotated to adjust the pitch of the rotor blade. At the same time, the rotational bearing element's engagement of the outward-facing cylindrical surface of the transition race bearing enables axial displacement of the rotational bearing against the outward-facing cylindrical surface to account for axial loads associated with the centrifugal force caused by rotation of the helicopter rotor blade. Enabling axial displacement of the rotational bearing element reduces uneven loading of the rotational bearing element and, thus, reduces wear on the bearing surfaces thereby increasing bearing service life.

Figure 1:
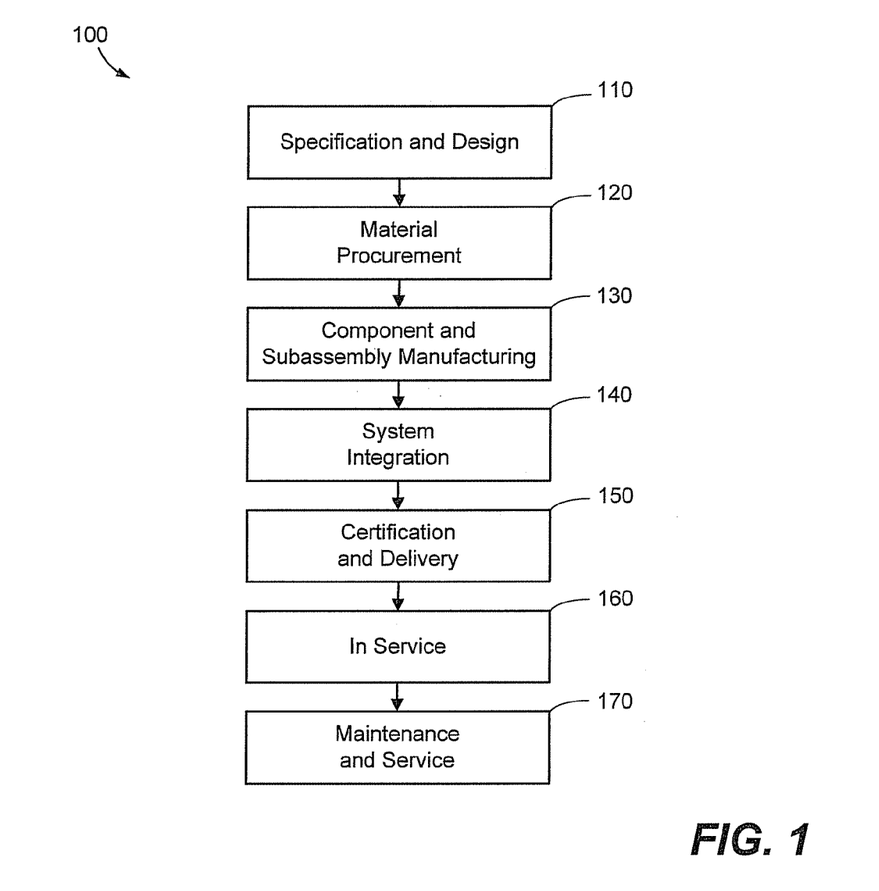
FIG. 1 is a flow diagram of aircraft production and service methodology.
Figure 2:
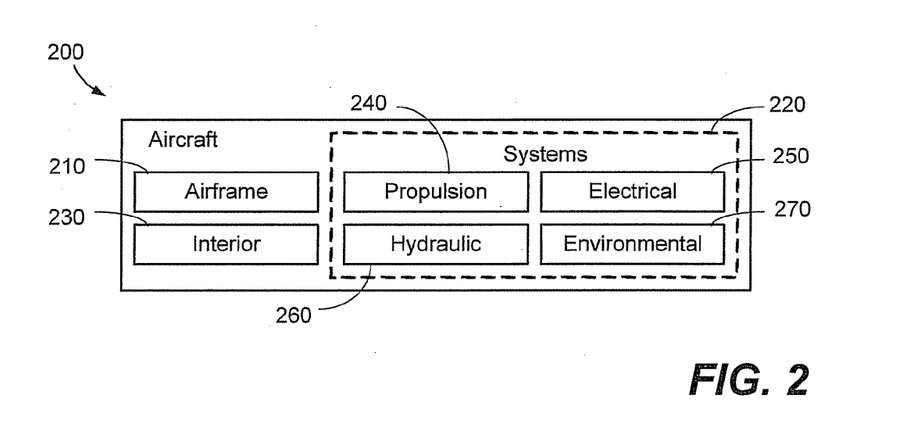
FIG. 2 is a block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 120 of the aircraft 200 and material procurement 120. During production, component and subassembly manufacturing 130 and system integration 140 of the aircraft 200 takes place. Thereafter, the aircraft 200 may go through certification and delivery 150 in order to be placed in service 160. While in service by a customer, the aircraft 200 is scheduled for routine maintenance and service 170 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 200 produced by exemplary method 100 may include an airframe 210 with a plurality of systems 220 and an interior 230. Examples of high-level systems 220 include one or more of a propulsion system 240, which may include embodiments of the present disclosure, an electrical system 250, a hydraulic system 260, and an environmental system 270. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 130 may be fabricated or manufactured in a manner similar to components or subassemblies produced while the aircraft 200 is in service. Also, one or more apparatus embodiments, method embodiments, or a combination thereof may be utilized during the production stages 130 and 140, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 170.

Figure 3:
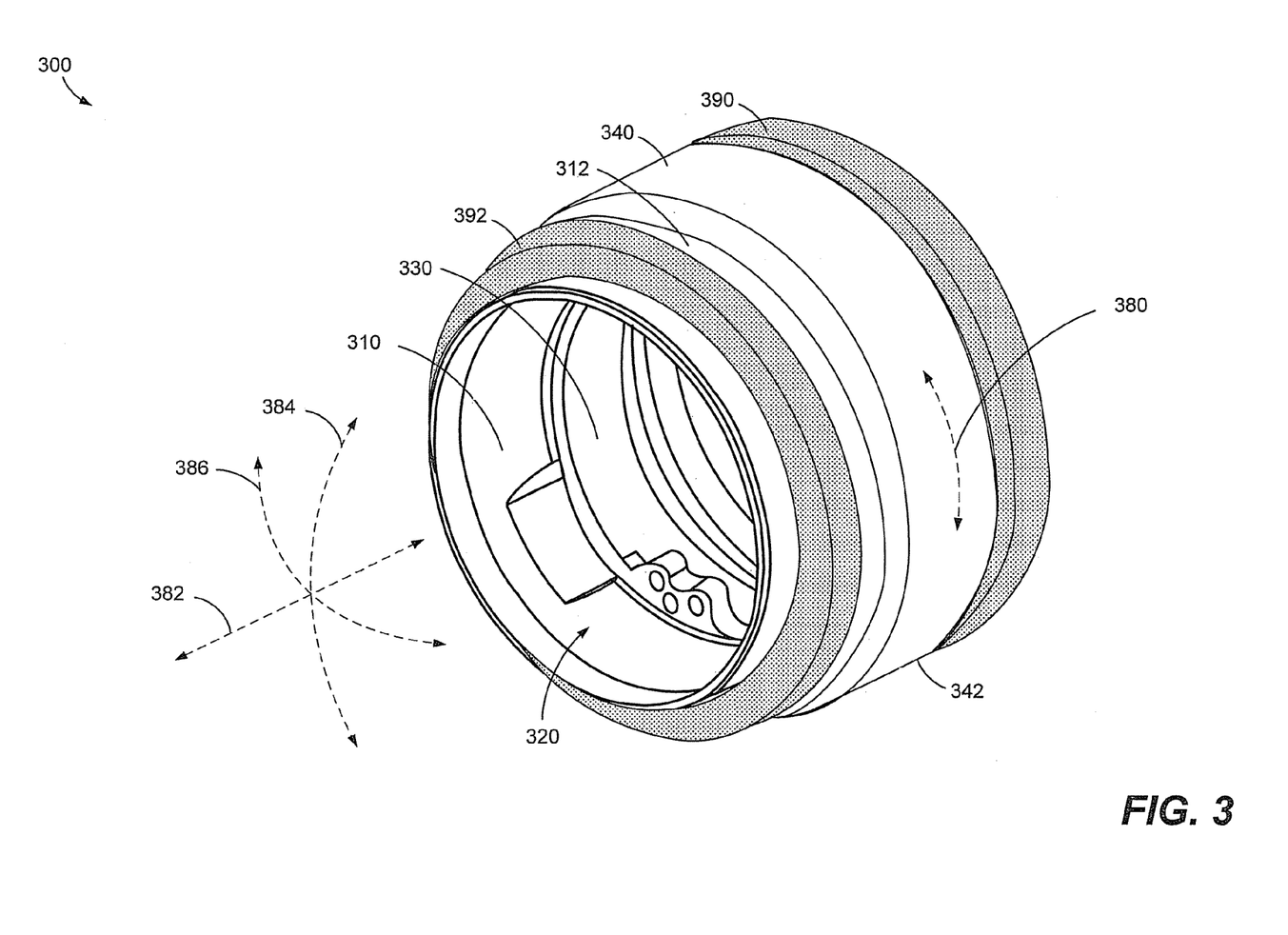
FIG. 3 is a perspective view of a bi-axial compliant bearing assembly according to a particular illustrative embodiment of the present disclosure.

FIG. 3 is a perspective view of a particular illustrative embodiment of a bi-axial compliant bearing assembly 300. In the particular illustrative embodiment, a transition bearing race 310 includes an outward-facing cylindrical surface 312 that receives a rotational bearing element 340. In the particular illustrative embodiment of FIG. 3, the bi-axial compliant bearing assembly 300 also includes a pair of lubricant seals 390 and 392. The lubricant seals 390 and 392 serve to contain a lubricant (not shown in FIG. 3) used to facilitate the rotational bearing element's 340 rotational movement relative to the outward-facing cylindrical surface 312 of the transition race bearing 310. The transition race bearing 310 also includes an axial opening 320 through which a spherically-compliant element 330 is received into the transition bearing race 310 as further described with reference to FIGS. 5A-5F.

In a particular illustrative embodiment, an outer surface 342 of the rotational bearing element 340 is fixably joined to a helicopter rotor blade (not shown in FIG. 3) while the spherically-compliant element 330 is coupled to a spindle arm of a helicopter rotor hub assembly (also not shown in FIG. 3). Using the bi-axial compliant bearing assembly 300 to join the helicopter rotor blade to the spindle arm enables the bi-axial compliant bearing assembly 300 to allow for rotational pitch adjustment of the helicopter rotor blade while accounting for axial and transverse stresses applied to and by the helicopter rotor blade.

The rotational engagement of the rotational bearing element 340 over the outward-facing cylindrical surface 312 of the transition bearing race 310 enables the helicopter rotor blade to be rotated to control pitch by enabling the rotational bearing element 340 to be rotated along a curve 380. The disposition of the rotational bearing element 340 on the outward-facing cylindrical surface 312 of the transition bearing race 310 enables the rotational bearing element 340 to be axially displaced along an axis 382. Enabling axial displacement of the rotational bearing element 340 prevents axial forces along the axis 382 from causing uneven or edge loading of the rotational bearing element 340. Thus, the engagement of the rotational bearing element 340 and the outward-facing cylindrical surface may prevent uneven loading of individual needle bearings, ball bearings, or tapered bearings (not shown in FIG. 3) within the rotational bearing element 340 that may cause uneven bearing wear.

The spherical engagement of the spherically-compliant element 330 within an inward-facing spherically-compliant surface (not shown in FIG. 3) of the transition bearing race 310 enables the spherically-compliant element 330 to rotate within the inward-facing spherically-compliant surface of the transition bearing race element 310. Spherical rotation of the spherically-compliant element 330 may enable the spherically-compliant element 330 to account for transverse stresses applied to the helicopter rotor blade by rotating transversely to the axis 382. Rotation of the spherically-compliant element 330 along a curve 384 accounts for up and down movement or "flap" of the helicopter rotor blade. Rotation of the spherically-compliant element 330 also may enable movement of the spherically-compliant element 330 along a curve 386 to account for lead and lag movement of the helicopter rotor blade. Combinations of flap or lead and lag movements of the helicopter rotor blade may result in combined movements along both curves 384 and 386 of the spherically-compliant element 330 that are transverse to the axis 382. Thus, the configuration of the transition race bearing 310 to engage the spherically-compliant element 330 and the rotational bearing element 340 allows for pitch adjustment of the helicopter rotor blade while providing bi-axial angular compliance, axial compliance, and conveyance of transverse loads using only a few components.

Figure 4:
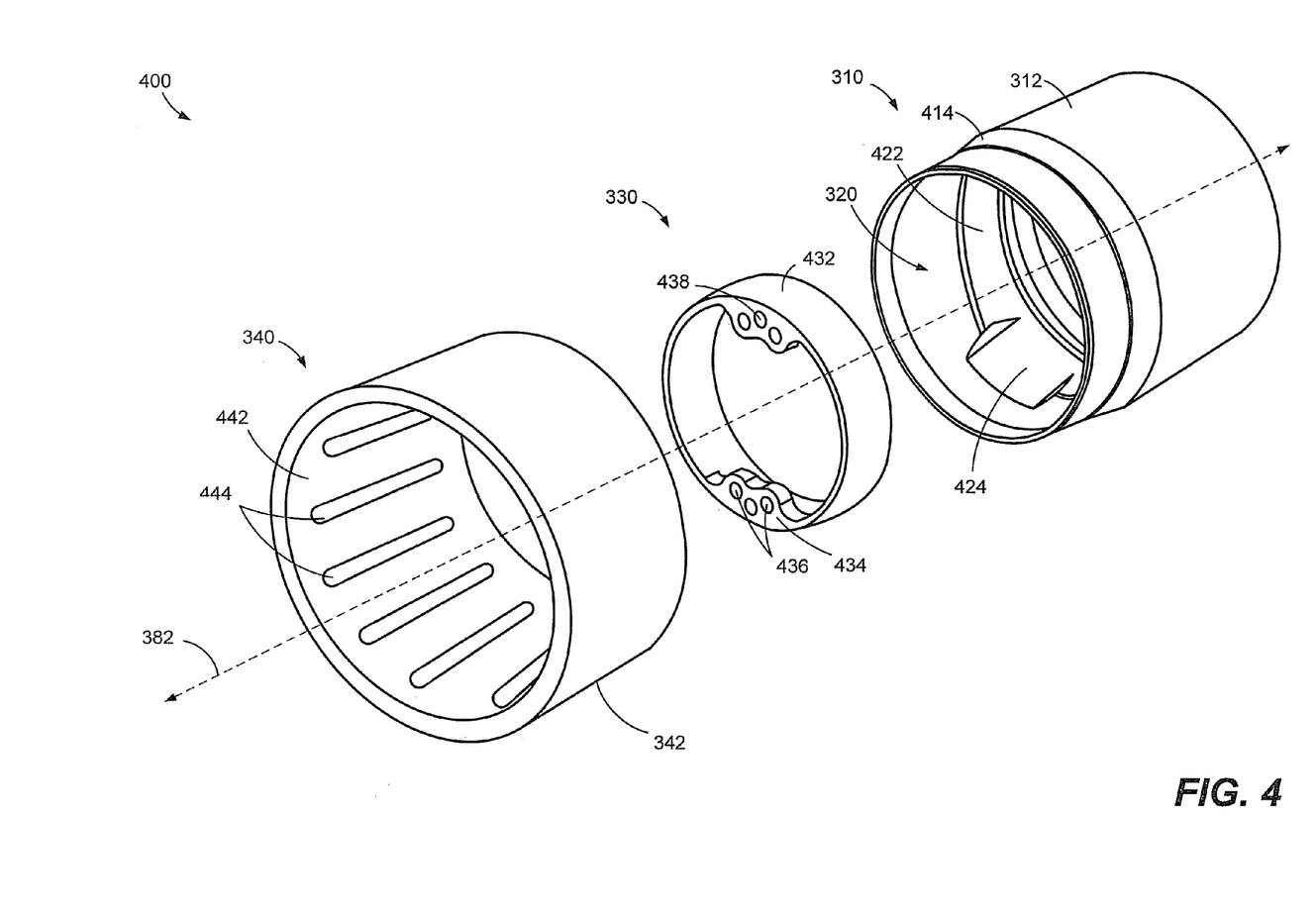
FIG. 4 is an exploded view of a transition bearing race, a spherically-compliant element, and a rotational bearing element of the bi-axial compliant bearing assembly of FIG. 3.

FIG. 4 is an exploded view 400 of a portion of the bi-axial compliant bearing assembly 300 of FIG. 3, showing the transition bearing race 310, the spherically-compliant element 330, and the rotational bearing element 340. FIG. 4 is provided to illustrate an inward-facing spherically-compliant surface 422 of the transition bearing race 310 and an outward-facing spherically-compliant surface 432 of the spherically compliant element 330. FIG. 4 also is provided to further illustrate the outward-facing cylindrical surface 312 of the transition bearing race 310 and an inward-facing cylindrical surface 442 of the rotational bearing element 340.

The transition bearing race element 310, as previously described with reference to FIG. 3, includes the outward-facing cylindrical surface 312 configured to receive the rotational bearing element 340. The transition bearing race element 310 also includes a loading ramp 414 abutting the outward-facing cylindrical surface 312. The loading ramp 414 facilitates receiving the rotational bearing element 340 and enables the rotational bearing element 340 to be positioned over the outward-facing cylindrical surface 312. The loading ramp 414 may prove especially helpful in mounting the rotational bearing element 340 onto the outward-facing cylindrical surface 312 when the rotational bearing element 340 is mounted within a cumbersome body that may visually obscure assembly elements. For example, when the rotational bearing element 340 is mounted within a helicopter rotor blade (not shown in FIG. 4) that may be difficult to align with great precision, the loading ramp 414 may help facilitate installation of the helicopter rotor blade. Moreover, the loading ramp 414 may facilitate blind assembly. For example, the rotational bearing element 340 may be housed within an opaque helicopter rotor blade that will block the view of a rotor spindle and transition bearing race element 310 on which the helicopter rotor blade is to be mounted. The loading ramp 414 will help guide the rotational bearing element 340 into place over the transition bearing race element 310 during such a blind assembly process.

The transition bearing race 310 also includes the axial opening 320 to receive the spherically-compliant element 330. The transitional bearing race 310 also includes the inward-facing spherically compliant surface 422 configured to receive and closely engage the spherically-compliant element 330. The transitional bearing race 310 includes a pair of loading slots 424 (of which one is shown in FIG. 4, with an opposing slot appearing on an opposite, inward-facing surface of the transition bearing race 310). The pair of loading slots 424 enables the spherically-compliant element 330 to be installed within the inward-facing spherically compliant surface 422, as is further described with reference to FIGS. 5A-5F. The pair of loading slots 424 is formed at a first end of the inward-facing spherically compliant surface 422 adjacent to the axial opening 320. Each of the pair of loading slots 424 is an opening or a discontinuity in the spherical-inward facing surface 422 that facilitates installation of the spherically-compliant element 330 without appreciably diminishing the size of the inward-facing spherically compliant surface 422.

The spherically-compliant element 330 is a section of a sphere that presents the outward-facing spherically-compliant surface 432. The outward-facing spherically-compliant 432 surface is configured to rotatably engage the inward-facing spherically compliant surface 422 of the transition bearing race 310. According to a particular illustrative embodiment, the spherically-compliant element 330 is a hollow spherical section to reduce the weight of the spherically-compliant element 330 and, thus, the overall weight of the bi-axial compliant bearing assembly 400. A hollow section embodiment of the spherically-compliant element 330 includes a plurality of mounting tabs 434 supporting a plurality of mounting holes 436. When used with a helicopter rotor assembly, the mounting tabs 434 can be regarded as a spindle coupling configured to engage a spindle arm. The mounting tabs 434 and the plurality of mounting holes 436 provide a mechanism enabling the spherically-compliant element 330 to be mounted to a helicopter rotor spindle (not shown in FIG. 4). To further reduce weight of the spherically-compliant element 330, the mounting tabs 434 may include one or more additional holes 438 that reduce the weight of the spherically-compliant element 330 by removing a portion of the mass of the mounting tabs 434.

The rotational bearing element 340 presents the inward-facing cylindrical surface 442 that supports a plurality of individual bearings 444. In a particular illustrative embodiment, the plurality of individual bearings 444 includes a plurality of rotating needle bearings. Alternatively, the plurality of individual bearings 444 may include a plurality of ball bearings where, for example, multiple groups of ball bearings are disposed along a length of the inward-facing cylindrical surface 442. The plurality of individual bearings 444 also may include a plurality of tapered roller bearings. Each of the plurality of individual bearings is configured to rotate about an axis that is generally coplanar with the axis 382 of the horizontal bearing assembly 400. Alternatively, the rotational bearing element 340 may include an inward-facing cylindrical surface 442 comprised of a reduced friction material or other friction-reducing elements. The rotational bearing element 340 also includes the outer surface 342 that, in a particular illustrative embodiment, fixably engages an end of a helicopter rotor blade or another body to be mounted using the bi-axial compliant bearing assembly 400.

Figure 5A:
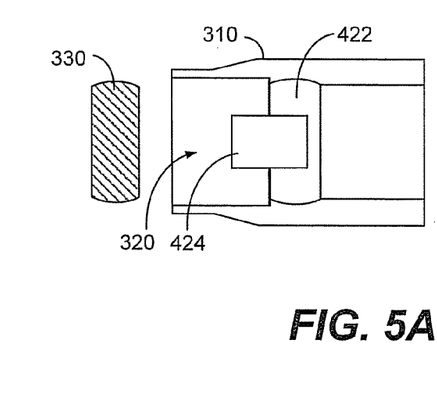
FIGS. 5A-5F are cross-sectional views of the spherically-compliant element being received into the transition bearing race of FIG. 4.

FIGS. 5A-5F are cross-sectional views of the spherically-compliant element 330 being received into the transition bearing race 310 of FIGS. 3 and 4. FIG. 5A shows the transition bearing race element 310 that supports an inward-facing spherically-compliant surface 422, an axial opening 320, and a loading slot 424. It will be appreciated that cutaway portions of the transition bearing race 310 in FIG. 5A-5F will be mirror images of the transition bearing race 310 as shown in FIGS. 5A-5F, including mirror images of the inward-facing spherically-compliant surfaces 422 and additional loading slots like the loading slot 424. The axial opening 320 and the pair of loading slots 424 are configured to receive the spherically-compliant element 330 into the inward-facing spherically-compliant surface 422.

Figure 5B:
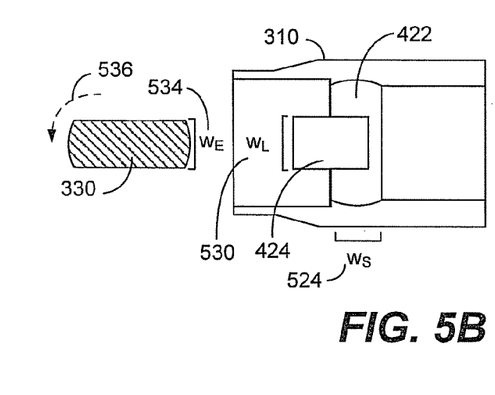

FIG. 5B shows the transition bearing race 310 including the inward-facing spherically-compliant surface 422 and the loading slot 424. The inward-facing spherically-compliant surface 422 has a surface width $w_S$ 524 that is configured to be only slightly larger than an element width $w_E$ 534 of a spherically-compliant element 330 to closely accommodate the spherically-compliant element 330. The loading slot 424 has a loading slot width $w_L$ 530 that is larger than the element width $w_E$ 534 to enable the spherically-compliant element 330 to be received into the inward-facing spherically-compliant surface 422. To enable the spherically-compliant element 330 to be received into the inward-facing spherically-compliant surface 422, the spherically-compliant element 330 is rotated on its edge through a curve 536. When presented edgewise, the spherically-compliant element 330 may be received into the loading slot 424.

Figure 5C:
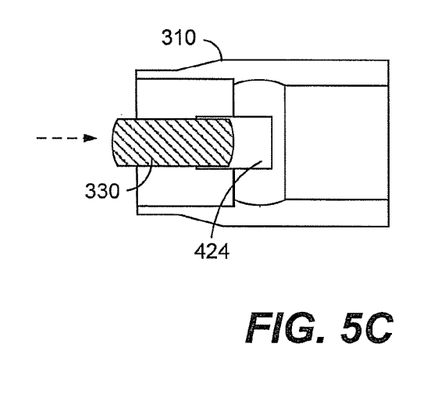
Figure 5D:
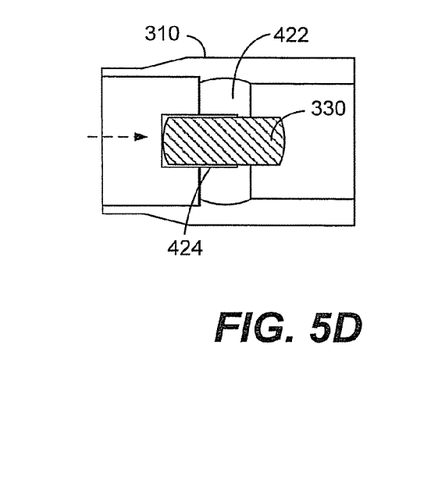

FIG. 5C shows the spherically-compliant element 330 being received into the loading slot 424 of the transition bearing race 310. FIG. 5D shows the spherically-compliant element 330 being received into the inward-facing spherically-compliant surface 422 of the transition bearing race 310. According to a particular illustrative embodiment, the loading slot 424 is shaped to receive the spherically-compliant element 330 into the inward-facing spherically-compliant surface 422 so that, when the spherically-compliant element 330 is fully inserted into the loading slot 424, the spherically-compliant element 330 will be positioned at a central point of the inward-facing spherically-compliant surface 422. The loading slot 424 may be curved along its width $w_L$ 530 with a curvature configured to accommodate the spherical outward-facing surface of the spherically-compliant element 330 when the spherically-compliant element 330 is turned on its edge as shown in FIG. 5B. Additionally, the loading slot 424 may be curved in a dimension perpendicular to the width $w_L$ 530. Alternatively, the loading slot 424 may be flat along its width $w_L$ 530 or in the dimension transverse to the width $w_L$ 530.

Figure 5E:
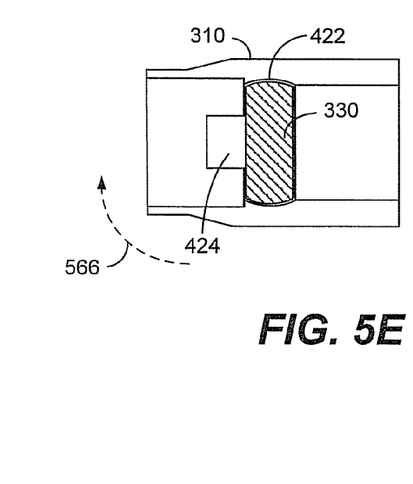

FIG. 5E shows the spherically-compliant element 330 rotated through a curve 566 to engage the inward-facing spherically-compliant surface 422 of the transition bearing race 310. Upon being rotated through the curve 566, the spherically-compliant element 330 is rotated out of the loading slot 424 and, thus, is secured within the inward-facing spherically-compliant surface 422 of the transition bearing race 310.

Figure 5F:
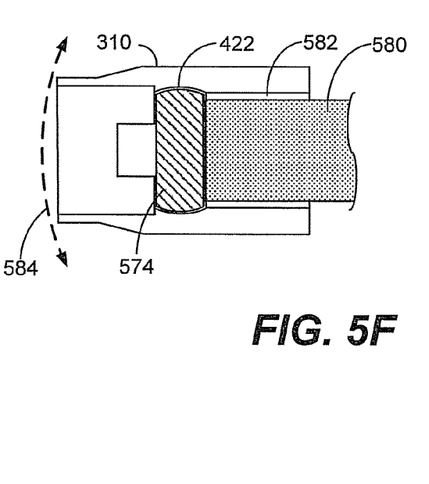

FIG. 5F shows a transition bearing race 310 as installed on a first body 580, such as a spindle arm of a helicopter rotor hub assembly as further described with reference to FIGS. 9 and 10. The transition bearing race 310 is installed on the first body 580 by coupling the spherically-compliant element 330 to the first body 580, such as by bolting the spherically-compliant element 330 to the first body 580 through mounting holes 436 as shown in FIG. 4. The first body 580 is received through a secondary opening 582 in the transition bearing race 310 at an opposing end of the transition bearing race 310 from the axial opening 320. The secondary opening 582 is sized to be slightly larger than the first body 580 to enable relative rotation between the transition bearing race 330 and the first body 580 by enabling the spherically-compliant element 330 to rotate relative to the first body 380 within the inward-facing spherically-compliant surface 422 of the transition bearing race 310 along a curve 584 in the plane of FIG. 5F (as well as in a plane perpendicular to that of FIG. 5F).

Figure 6A:
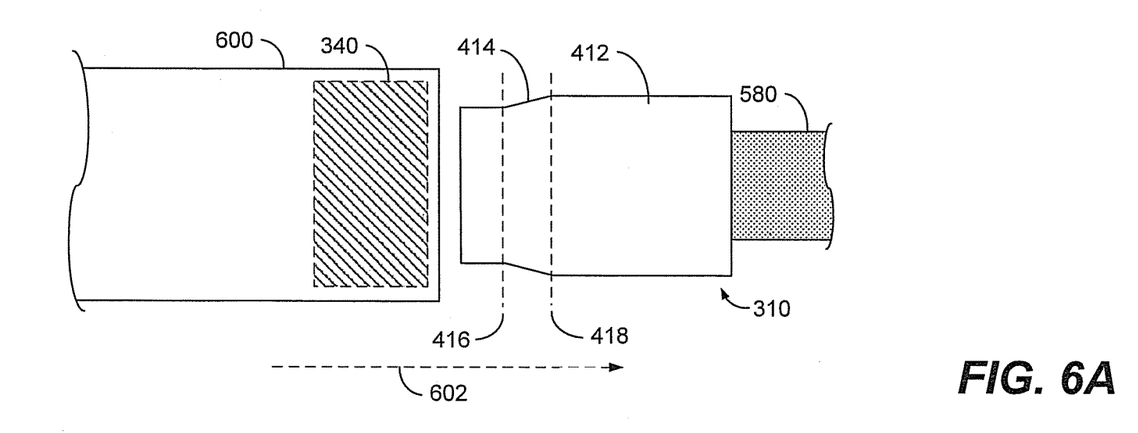
FIGS. 6A-6B are cutaway views of a helicopter rotor equipped with a rotational bearing being received on an outer surface of the transition bearing race of FIG. 4.
Figure 6B:
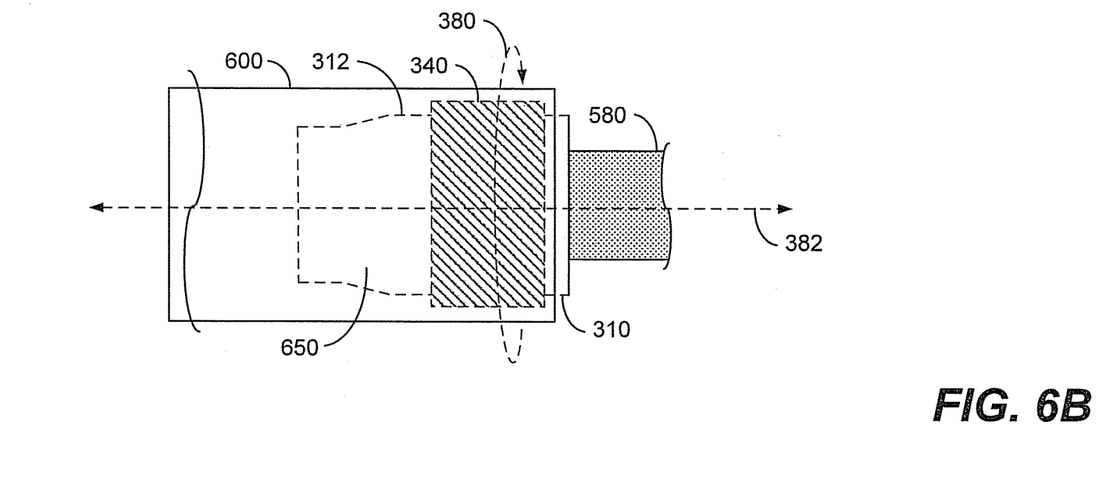

FIGS. 6A-6B are cutaway views of a second body 600, such as a helicopter rotor blade, affixed to a rotational bearing element 340 that is being received on the outward-facing cylindrical surface 312 of the transition bearing race 310. The transition bearing race 310 has been coupled to the first body 580, such as a helicopter rotor spindle as previously described with reference to FIG. 5F.

FIG. 6A shows the second body 600 before it is installed on the transition bearing race 310. To install the second body 600 equipped with the rotational bearing element 340 (and thus to complete the bi-axial compliant bearing assembly as previously described), the second body 600 is translated along a path 602 to slide the rotational bearing element 340 over the outward-facing cylindrical surface 312 of the transition bearing race 310. Installing the necessarily close-fitting rotational bearing element 340 over the outward-facing cylindrical surface 312 may be difficult, thus, the transition bearing race 310 includes the loading ramp 414. The loading ramp 414 is narrower that the outward-facing cylindrical surface 312 at a first end 416 disposed away from the outward-facing cylindrical surface 312. The loading ramp 414 widens to transition to the outward-facing cylindrical surface 312 at a second end abutting the outward-facing cylindrical surface 312. Thus, the loading ramp 414 is configured to receive the rotational bearing element 340 and assist in guiding the rotational bearing element 340 onto the outward-facing cylindrical surface 312 of the transition bearing race 310 as the rotational bearing element 340 is translated along the path 602. As previously described, the loading ramp 414 thereby assists in assembly when positioning one or more of the bodies is cumbersome or unwieldy. Moreover, as also previously described, the loading ramp 414 facilitates blind assembly of the bi-axial compliant bearing assembly when one or more parts of the assembly are blocked from view by one or more bodies that the assembly will join.

FIG. 6B shows the second body 600 and the rotational bearing element 340 installed in place over the transitional bearing race 310. The rotational bearing element 340 enables the second body 600 to rotate along the curve 380 to adjust a pitch of the second body 600 relative to the first body 580. In addition, to prevent or reduce uneven bearing loading, the rotational bearing element 340 is able to translate or slide along the axis 382 to account for axial displacements due to centrifugal force caused by rotation of the second body 600.

Figure 7:
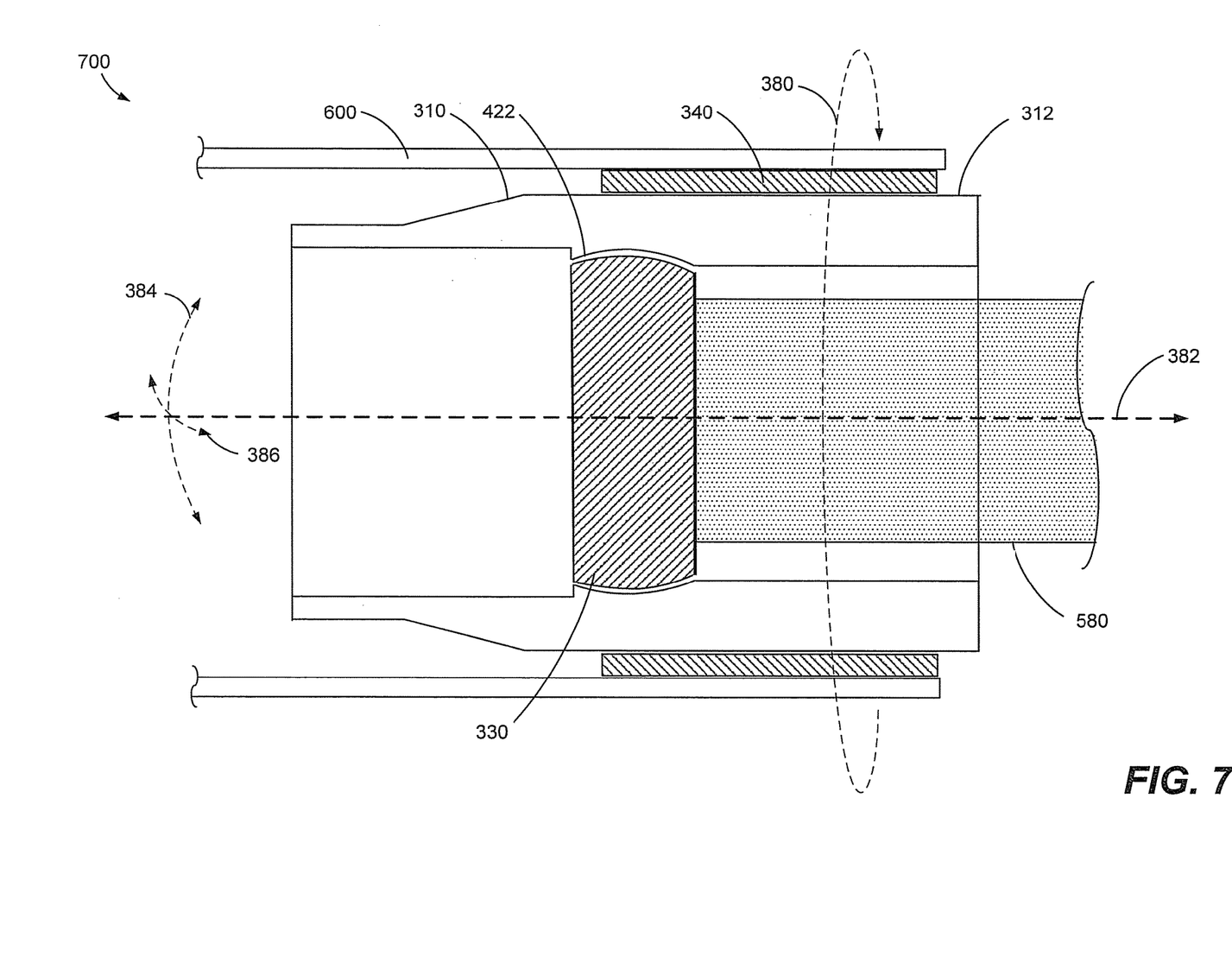
FIG. 7 is a cross-sectional view of the bi-axial compliant bearing assembly of FIG. 3 joining a helicopter rotor to a helicopter rotor spindle.

FIG. 7 is a cross-sectional view of an assembled bi-axial compliant bearing assembly 700 used to couple the first body 580, such as a spindle arm of a helicopter rotor hub assembly, to a second body 600, such as a helicopter rotor blade. The cross-sectional view of the bi-axial compliant bearing assembly 700 is provided to fully illustrate the bi-axial compliance provided by the bi-axial compliant bearing assembly 700.

The outward-facing cylindrical surface 312 of the transition bearing race 310 that engages the rotational bearing element 340. The transition bearing race 310 enables the rotational bearing element 340 to rotate about the outward-facing cylindrical surface 312 along a curve 380. The transition bearing race 310 also enables the rotational bearing element 340 to translate along the outward-facing cylindrical surface 312 along the axis 382. When the second body 600 is coupled to the rotational bearing element 340, the engagement of the rotational bearing element 340 with the outward-facing cylindrical surface 312 of the transition bearing race 310, pitch of the second body 600, such as a helicopter rotor blade, may be adjusted. In addition, axial forces applied by the second body 600 along the axis 382 are allocated by axial displacement of the rotational bearing element 340 along the outward-facing cylindrical surface 312 of the transition bearing race 310.

The transition bearing race 310 also includes the inward-facing spherically-compliant surface 422 that engages the spherically-compliant element 330 mounted to the first body 580, such as a spindle arm of a helicopter rotor hub assembly. The inward-facing spherically-compliant surface 422 is an inward-facing spherical section. The inward-facing spherically-compliant inward surface 422 rotatably engages the spherically-compliant element 330 to enable the second body 600 to rotate along curves 384 and 386 and other curves transverse to the axis 382, thus enabling the second body 600 to rotate relative to the first body 580.

Figure 8:
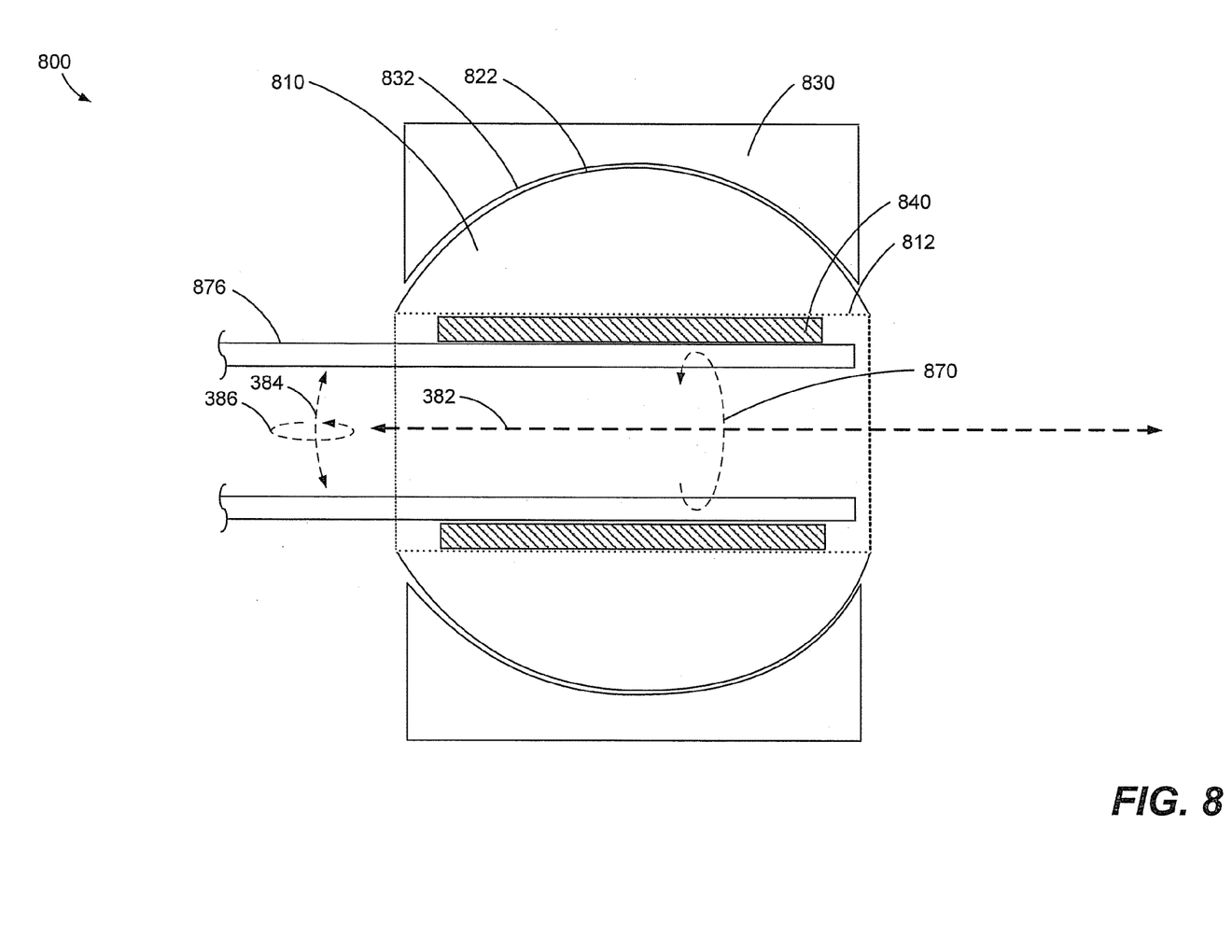
FIG. 8 is a cross-sectional view of an alternative embodiment of a bi-axial compliant bearing assembly joining two bodies.

FIG. 8 is a cross-sectional view of an alternative embodiment of a bi-axial compliant bearing assembly 800. By comparison with the particular illustrative embodiment of the bi-axial compliant bearing assembly 700 of FIG. 7, the bi-axial compliant bearing assembly 800 includes an alternative embodiment of a transition bearing race 810. The transition bearing race 310 of FIG. 7 includes an outward-facing cylindrical surface 312 and an inward-facing spherically-compliant surface 422. By contrast, the transition bearing race 810 of FIG. 8 includes an inward-facing cylindrical surface 812 and an outward-facing spherically-compliant surface 822.

In one particular illustrative embodiment, the bi-axial compliant bearing assembly 800 couples a first body 876 to a second body 830. The first body 876 is coupled to a rotational bearing element 840 configured to outwardly engage the inward-facing cylindrical surface 812. The transition bearing race 810 thus enables the rotational bearing element 840 to rotate about the inward-facing cylindrical surface 812 along a curve 870. The transition bearing race 810 also enables the rotational bearing element 840 to translate along the inward-facing cylindrical surface 812 along the axis 382. The relative translation of the rotational bearing element 840 and the inward-facing cylindrical surface 812 also accommodates relative stretching or compression of the elements that may change the relative position of one of the elements to another.

The transition bearing race 810 also includes an outward-facing spherically-compliant surface 822 that engages an inward-facing spherically-compliant surface 832 of the second body 830. The outward-facing spherically-compliant surface 822 is an outward-facing spherical section. The outward-facing spherically-compliant surface 822 rotatably engages the inward-facing spherically-compliant surface 832 to enable the first body 876 to rotate along curves 384 and 386 or other curves transverse to the axis 382, thus enabling the first body 876 to rotate relative to the second body 830.

Figure 9:
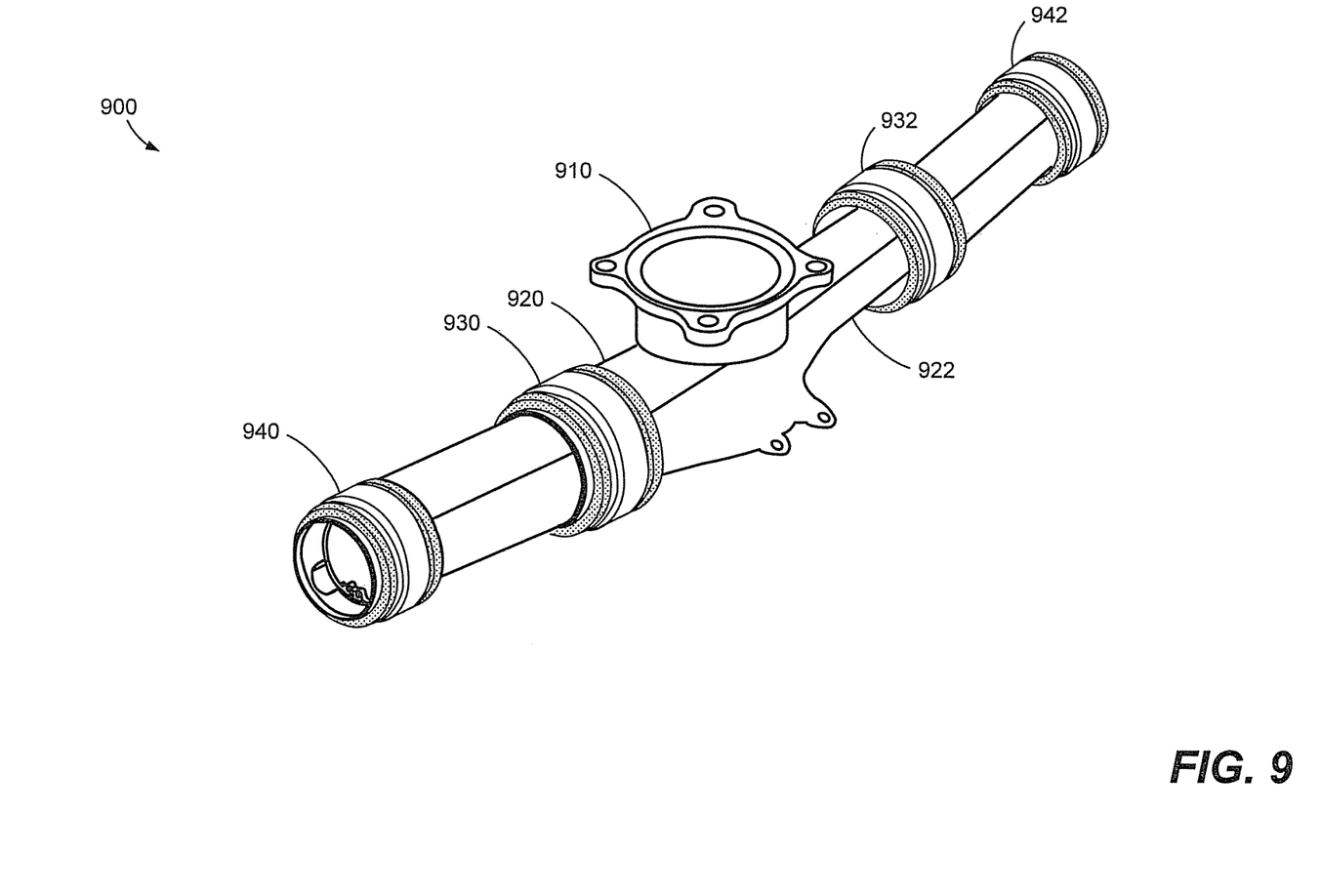
FIG. 9 is a perspective view of a helicopter rotor hub assembly employing bi-axial compliant bearings.

FIG. 9 is a perspective view of a helicopter rotor hub assembly 900 employing bi-axial compliant bearings 930 and 940. According to one particular illustrative embodiment, to facilitate helicopter rotor blade pitch adjustment and to distribute axial and rotational forces, a helicopter rotor hub 910 supports a plurality of spindle arms 920 and 922 that extend outwardly from the helicopter rotor hub 910. Each of the spindle arms 920 and 922 is equipped with an inboard bi-axial compliant bearing assembly 930 and 932 and an outboard-bi-axial compliant bearing assembly 940 and 942. A spherically-compliant element (not shown in FIG. 9) of each of the inboard bi-axial compliant bearing assemblies 930 and 932 and the outboard bi-axial compliant bearing assemblies 940 and 942 is coupled to each of the respective spindle arms 920 and 922. The inboard bi-axial compliant bearing assemblies 930 and 932 and the outboard bi-axial compliant bearing assemblies 940 and 942 serve to react to axial and lateral forces across both the inboard bi-axial compliant bearing assemblies 930 and 932 and the outboard bi-axial compliant bearing assemblies 940 and 942 while accommodating axial deflections and lateral angular deflections. Alternatively, a helicopter rotor blade may be supported by a single bi-axial compliant bearing assembly.

Figure 10:
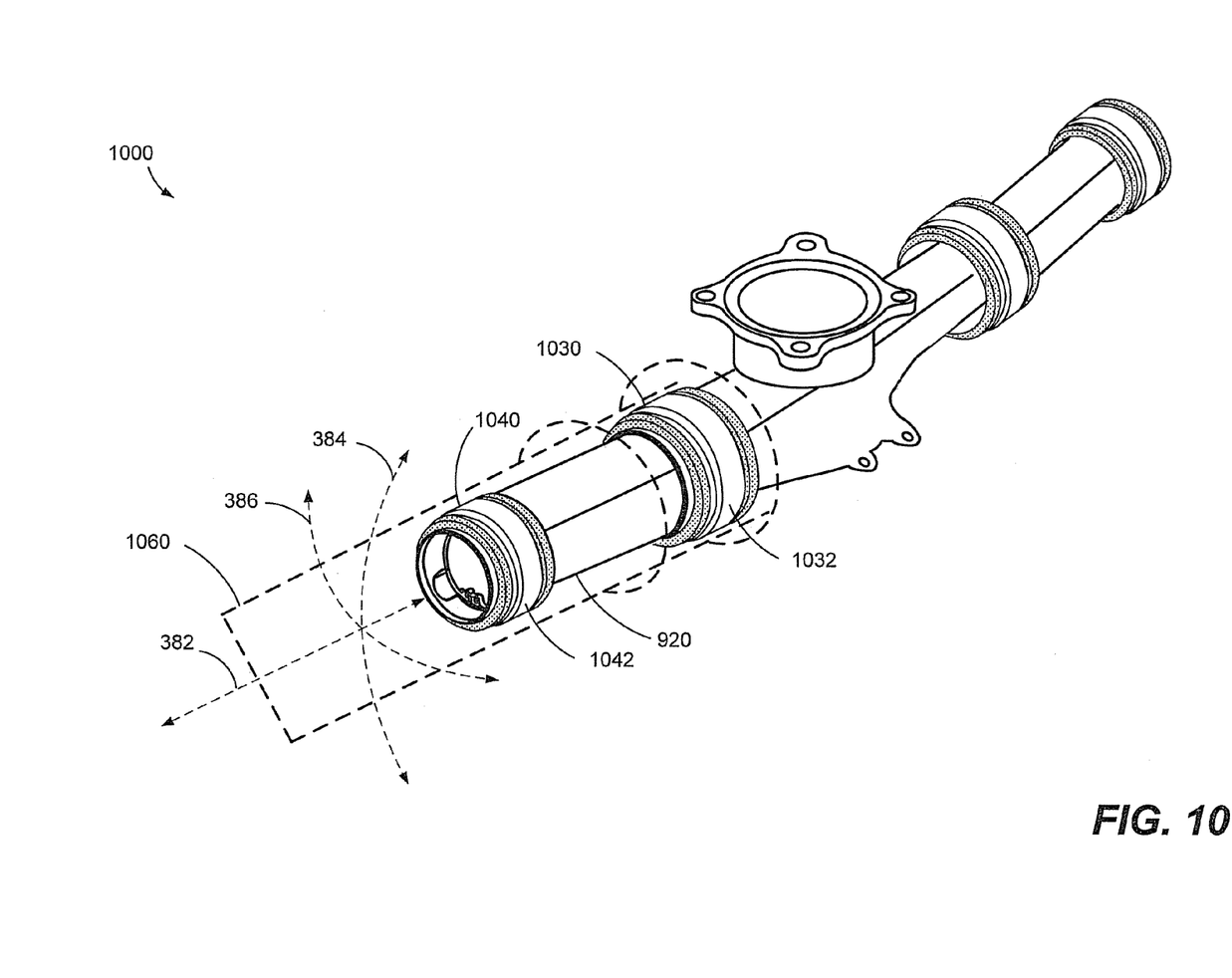
FIG. 10 is a perspective cutaway view of a helicopter rotor blade mounted on the helicopter rotor hub assembly of FIG. 9.

FIG. 10 is a perspective cutaway view of a helicopter rotor hub assembly 1000, like the helicopter rotor hub assembly 900 of FIG. 9, on which a helicopter rotor blade 1060 is mounted on the helicopter rotor hub assembly 1000 using embodiments of bi-axial compliant bearing assemblies 1030 and 1040. In one particular illustrative embodiment, the inboard bi-axial bearing assembly 1030 and the outboard bi-axial bearing assembly 1040 are mounted on the spindle arm 920. The helicopter rotor blade 1060 is affixed to an outer surface 1032 of an inboard bi-axial compliant bearing assembly 1030 and an outer surface 1042 of an outboard bi-axial compliant bearing assembly 1040. Mounting the helicopter rotor blade 1060 using the bi-axial compliant bearing assemblies 1030 and 1040 enables axial displacement of the helicopter rotor blade 1060 along the axis 382. Using the helicopter rotor blade 1060 also enables rotation of the helicopter rotor blade 1060 around the axis 382 and along curves 384 and 386 and other curves transverse to the axis 382. In this embodiment, approximately five degrees of misalignment is permitted, although up to fifteen degrees of angular deflection could be readily accommodated by varying the geometry of the spherically-compliant element and the spherically-compliant surfaces.

Figure 11:
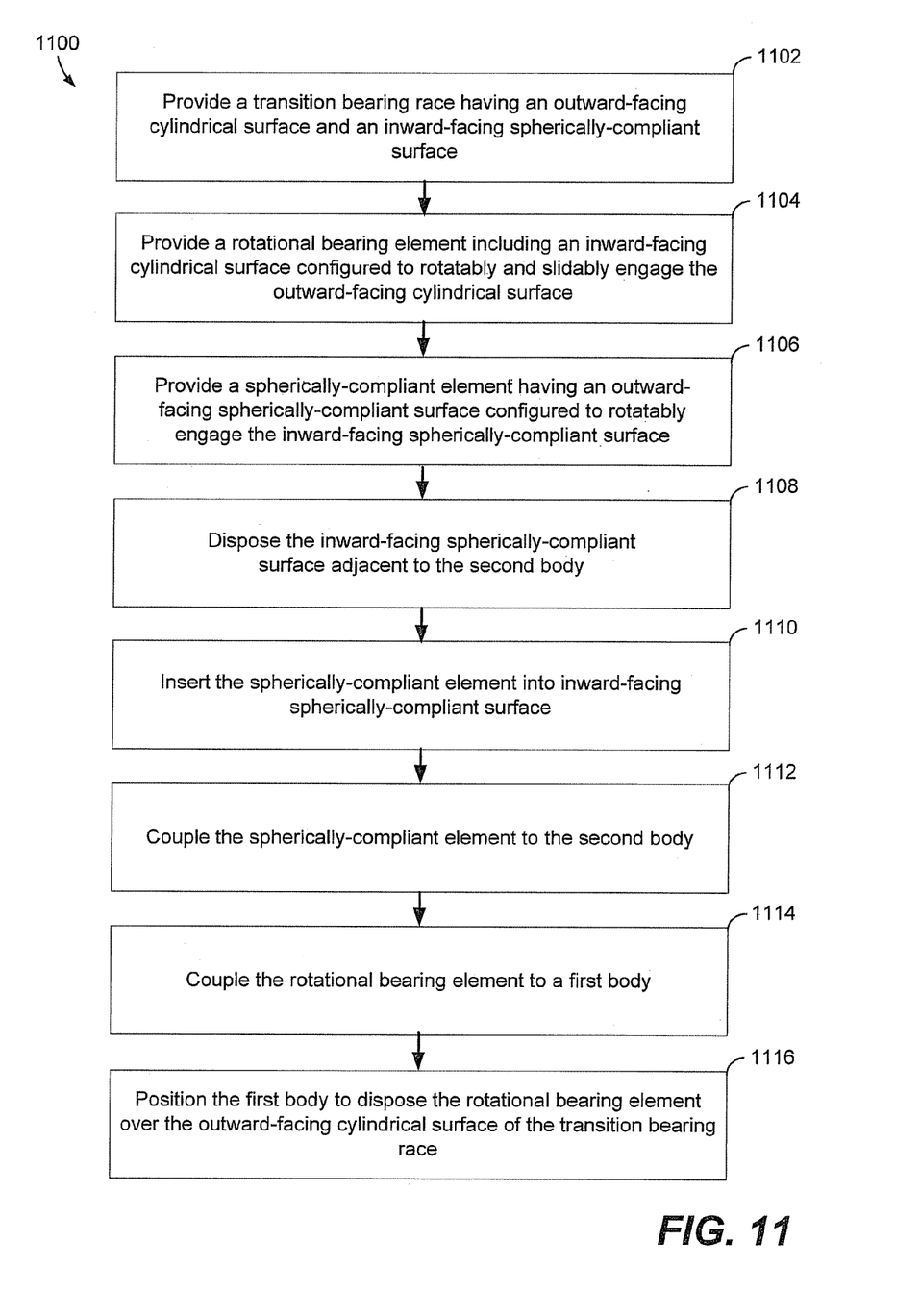
FIG. 11 is a flow diagram of a process for coupling a first body to a second body using an embodiment of a bi-axial compliant bearing assembly.

FIG. 11 is a flow diagram of a particular illustrative embodiment of a method for joining a first body, such as a helicopter rotor blade, to a second body, such as a spindle arm of a helicopter rotor hub assembly. A transition bearing race having an outward-facing cylindrical surface and an inward-facing spherically-compliant surface is provided, at 1102. A rotational bearing element including an inward-facing cylindrical surface configured to rotatably and slidably engage the outward-facing cylindrical surface is provided, at 1104. A spherically-compliant element having an outward-facing spherically-compliant surface configured to rotatably engage the inward-facing spherically-compliant surface is provided, at 1106. The inward-facing spherically-compliant surface is disposed adjacent to the second body, at 1108. The spherically-compliant element is inserted into inward-facing spherically-compliant surface, at 1110. The spherically-compliant element is coupled to the second body, at 1112. The rotational bearing element is coupled to a first body, at 1114. The first body is positioned to dispose the rotational bearing element over the outward-facing cylindrical surface of the transition bearing race, at 1116.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A transition bearing race, comprising:
    a cylindrical surface configured to rotatably engage a rotational bearing element and to slidably engage the rotational bearing element along a first axis; and
    a spherically-compliant surface including at least a section of a spherical surface and at least one loading slot, the spherically-compliant surface configured to engage a spherically-compliant element, wherein the at least one loading slot is configured to facilitate engagement of the spherically-compliant element with the spherically-compliant surface, and the spherically-compliant element, when engaged with the spherically-compliant surface, is enabled to:
        change an angle of intersection between a second axis of the spherically-compliant element and the first axis; and
        rotate around the first axis.

2. The transition bearing race of claim 1, wherein:
    the cylindrical surface includes an outward-facing cylindrical surface configured to receive an inward-facing cylindrical surface of the rotational bearing element; and
    the spherically-compliant surface includes an inward-facing spherically-compliant surface configured to engage an outward-facing spherically-compliant surface of the spherically-compliant element.

3. The transition bearing race of claim 2, further comprising a pair of loading slots formed within opposing sides of the inward-facing spherically-compliant surface at a first end of the inward-facing spherically-compliant surface, wherein the pair of loading slots enables the spherically-compliant element to be slidably received within the inward-facing spherically-compliant surface.

4. The transition bearing race of claim 2, further comprising a loading ramp at a first end of the outward-facing cylindrical surface, wherein the loading ramp facilitates the inward-facing cylindrical surface of the rotational bearing element being slidably received over the outward-facing cylindrical surface.

5. The transition bearing race of claim 1, wherein:
    the cylindrical surface includes an inward-facing cylindrical surface configured to receive an outward-facing cylindrical surface of the rotational bearing element; and
    the spherically-compliant surface includes an outward-facing spherically-compliant surface configured to engage an inward-facing spherically-compliant surface of the spherically-compliant element.

6. A system, comprising:
    a transition bearing race, comprising:
        an outward-facing cylindrical surface disposed about an axis; and
        an inward-facing spherically-compliant surface including at least one loading slot;
    a rotational bearing element including an inward-facing cylindrical surface configured to rotatably and slidably engage the outward-facing cylindrical surface along the axis; and
    a spherically-compliant element having an outward-facing spherically-compliant surface configured to rotatably engage the inward-facing spherically-compliant surface to enable the spherically-compliant element to rotate transversely to the axis, the at least one loading slot to enable the spherically-compliant element to be slidably received by the inward-facing spherically-compliant surface.

7. The system of claim 6, further comprising a pair of loading slots formed within opposing sides of the inward-facing spherically-compliant surface and at a first end of the inward-facing spherically-compliant surface, wherein the pair of loading slots enables the spherically-compliant element to be slidably received by the inward-facing spherically-compliant surface.

8. The system of claim 7, wherein each of the pair of loading slots has a loading slot width and the spherically-compliant element has an element width, such that the element width of the spherically-compliant element is less than the loading slot width of each of the pair of loading slots.

9. The system of claim 8, wherein the spherically-compliant element includes a plurality of mounting holes configured to enable the spherically-compliant element to be coupled to a first body after the spherically-compliant element has been received by the inward-facing spherically-compliant surface.

10. The system of claim 9, wherein the first body includes a spindle arm of a helicopter rotor hub assembly.

11. The system of claim 10, wherein the spherically-compliant element enables spherical compliance of the transition bearing race with respect to the spindle arm of the helicopter rotor hub assembly.

12. The system of claim 6, further comprising a loading ramp at a first end of the outward-facing cylindrical surface, wherein the loading ramp facilitates the inward-facing cylindrical surface of the rotational bearing element being slidably received over the outward-facing cylindrical surface.

13. The system of claim 6, wherein the rotational bearing element includes a plurality of rotatable bearings disposed on the inward-facing cylindrical surface, wherein each of the plurality of rotatable bearings has a rotation axis substantially coplanar with the axis and wherein the plurality of rotatable bearings is configured to enable the inward-facing cylindrical surface of the rotational bearing element to rotatably engage the outward-facing cylindrical surface.

14. The system of claim 13, wherein the plurality of rotatable bearings include one or more of needle bearings, tapered roller bearings, and ball bearings.

15. The system of claim 13, further comprising one or more lubricant seals disposed on opposing sides of the rotational bearing element to contain a lubricant disposed between the inward-facing cylindrical surface of the rotational bearing element and the outward-facing cylindrical surface.

16. The system of claim 13, wherein the rotational bearing element is coupled to a helicopter rotor blade, wherein the rotational bearing element rotating around the axis enables rotation of the helicopter rotor blade to enable pitch adjustment of the helicopter rotor blade.

17. The system of claim 16, wherein the inward-facing cylindrical surface of the rotational bearing element slidably engages the outward-facing cylindrical surface to enable axial compliance of the helicopter rotor blade with respect to the transition bearing race.

18. A helicopter rotor hub assembly, comprising:
a plurality of spindle arms, each of the plurality of spindle arms extending radially from a rotor hub; and
a plurality of bi-axial compliant bearing assemblies, each of the plurality of bi-axial compliant bearing assemblies comprising:
a transition bearing race including an outward-facing cylindrical surface and an inward-facing spherically-compliant surface;
a rotational bearing element including an inward-facing cylindrical surface configured to rotatably and slidably engage the outward-facing cylindrical surface of the transition bearing race and an outer surface configured to engage a helicopter rotor blade; and
a spherically-compliant element including an outward-facing spherically-compliant surface configured to rotatably engage the inward-facing spherically-compliant surface and a spindle coupling configured to be coupled to one of the plurality of spindle arms.

19. The helicopter rotor hub assembly of claim 18, wherein each of the plurality of spindle arms supports both an inboard bi-axial compliant bearing assembly and an outboard bi-axial compliant bearing assembly.

20. The helicopter rotor hub assembly of claim 19, wherein the helicopter rotor blade engages the rotational bearing element of each of the inboard bi-axial compliant bearing assembly and the outboard bi-axial compliant bearing assembly.

21. A method, comprising:
providing a transition bearing race, comprising:
an outward-facing cylindrical surface disposed about an axis; and
an inward-facing spherically-compliant surface including at least one loading slot;
providing a rotational bearing element having an inward-facing cylindrical surface configured to rotatably and slidably engage the outward-facing cylindrical surface;
providing a spherically-compliant element having an outward-facing spherically-compliant surface configured to rotatably engage the inward-facing spherically-compliant surface;
coupling the rotational bearing element to a first body;
disposing the inward-facing spherically-compliant surface adjacent to a second body;
inserting the spherically-compliant element into the inward-facing spherically-compliant surface, the at least one loading slot configured to facilitate inserting the spherically-compliant element into the inward-facing spherically-compliant surface;
coupling the spherically-compliant element to the second body; and
positioning the first body to dispose the rotational bearing element over the outward-facing cylindrical surface of the transition bearing race.

22. The method of claim 21, wherein the inward-facing spherically-compliant surface includes a pair of loading slots configured to receive an edge of the spherically-compliant element, wherein the pair of loading slots is configured to facilitate inserting the spherically-compliant element into the inward-facing spherically-compliant surface.

23. The method of claim 22, further comprising rotating the spherically-compliant element such that its edge is receivable into the pair of loading slots.

24. The method of claim 21, wherein the outward-facing cylindrical surface of the transition bearing race includes a loading ramp at an end of the outward-facing cylindrical surface, wherein the loading ramp is configured to receive the inward-facing cylindrical surface of the rotational bearing element and guide the rotational beating element over the outward-facing cylindrical surface of the transition bearing race.

25. A bi-axial compliant bearing assembly for coupling a helicopter rotor blade to a helicopter rotor hub assembly, comprising:
a transition bearing race, comprising:
an outward-facing cylindrical surface disposed about an axis;
a loading ramp abutting an edge of the outward-facing cylindrical surface, the loading ramp configured to guide an inward-facing cylindrical surface into place over the outward-facing cylindrical surface; and
an inward-facing spherically-compliant surface including a pair of loading slots configured to receive an outward-facing spherically-compliant surface when the outward-facing spherically compliant surface is rotated and presented edgewise into the pair of loading slots;
a rotational bearing element, comprising:
an outer surface configured to engage a helicopter rotor blade;
the inward-facing cylindrical surface configured to rotatably engage the outward-facing cylindrical surface about the axis and to slidably engage the outward-facing cylindrical surface along the axis; and
a plurality of individual bearings supported by the inward-facing cylindrical surface, the plurality of individual bearings configured to enable the rotational bearing element to rotatably engage the outward-facing cylindrical surface; and
a spherically-compliant element, comprising:
the outward-facing spherically-compliant surface configured to rotatably engage the inward-facing spherically-compliant surface to enable the spherically-compliant element to rotate transversely to the axis; and
a plurality of mounting tabs configured to engage a spindle arm of a helicopter rotor hub assembly.

26. The transition bearing race of claim 1, wherein the at least the section of the spherical surface has a cross-section along the first axis that has a curved profile.

27. The transition bearing race of claim 26, wherein a first circumference at a first point of the curved profile is a different size than a second circumference at a second point of the curved profile.

* * * * *